United States Patent [19]
Visscher

[11] Patent Number: 5,814,720
[45] Date of Patent: Sep. 29, 1998

[54] AIR PRESSURE SENSOR CONTROL SYSTEM

[76] Inventor: Paul R. Visscher, 6283 136th Ave., Saugatuck, Mich. 49453

[21] Appl. No.: 802,390

[22] Filed: Feb. 18, 1997

[51] Int. Cl.⁶ ............................................. G01M 3/02
[52] U.S. Cl. ............................................. 73/37
[58] Field of Search .................... 73/37, 37.5, 37.8

[56] References Cited

U.S. PATENT DOCUMENTS

| | | | |
|---|---|---|---|
| 3,745,717 | 7/1973 | Robinson | 51/135 BT |
| 3,769,475 | 10/1973 | Czwakiel | 200/81.9 |
| 3,822,877 | 7/1974 | Littleton | 270/56 |
| 3,859,015 | 1/1975 | O'Brien | 425/29 |
| 3,877,485 | 4/1975 | Wojcikowski | 137/829 |
| 3,983,636 | 10/1976 | Fashbaugh et al. | 33/346 |
| 4,103,535 | 8/1978 | Mutter et al. | 73/37.5 |
| 4,111,624 | 9/1978 | Hanson | 425/135 |
| 4,458,519 | 7/1984 | Day et al. | 73/37 |
| 4,611,619 | 9/1986 | Payne | 137/82 |
| 4,958,063 | 9/1990 | Hausmann | 235/201 FS |
| 5,244,372 | 9/1993 | Ramsey et al. | 73/37.5 |

*Primary Examiner*—Hezron E. Williams
*Assistant Examiner*—Jay L. Politzer
*Attorney, Agent, or Firm*—Malcolm R. McKinnon

[57] ABSTRACT

An improved air pressure sensor control system operable to sense the presence or absence of workpieces and other articles, to sense the position and orientation of such articles, to sense the size of such articles with respect to predetermined parameters, to sense multiple criteria and multiple applications, and to operate under adverse environmental conditions.

20 Claims, 4 Drawing Sheets

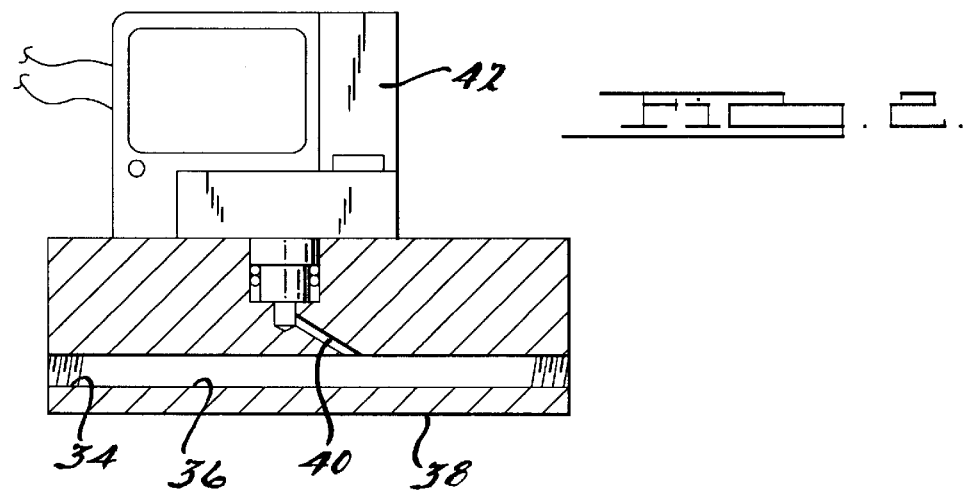
FIG. 2.
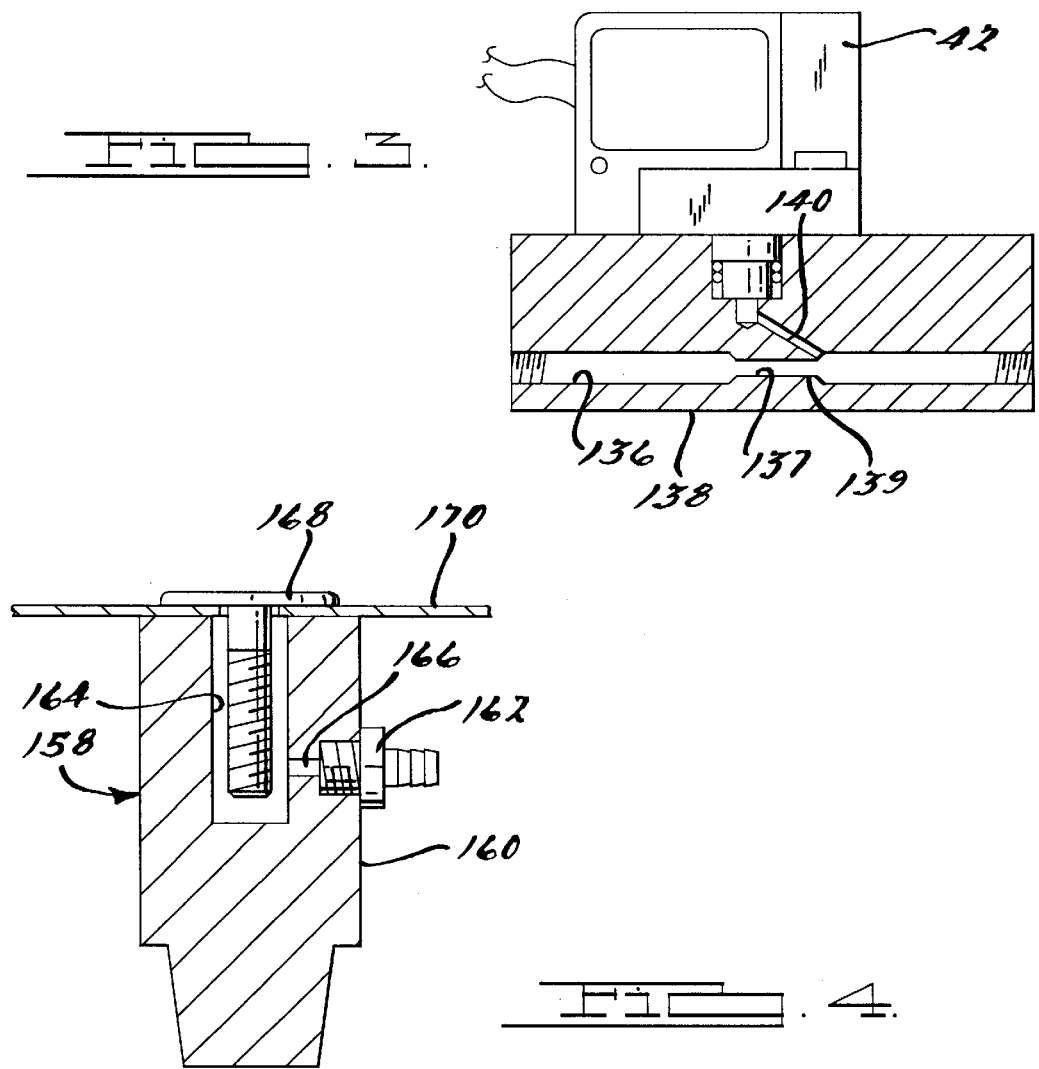
FIG. 3.
FIG. 4.

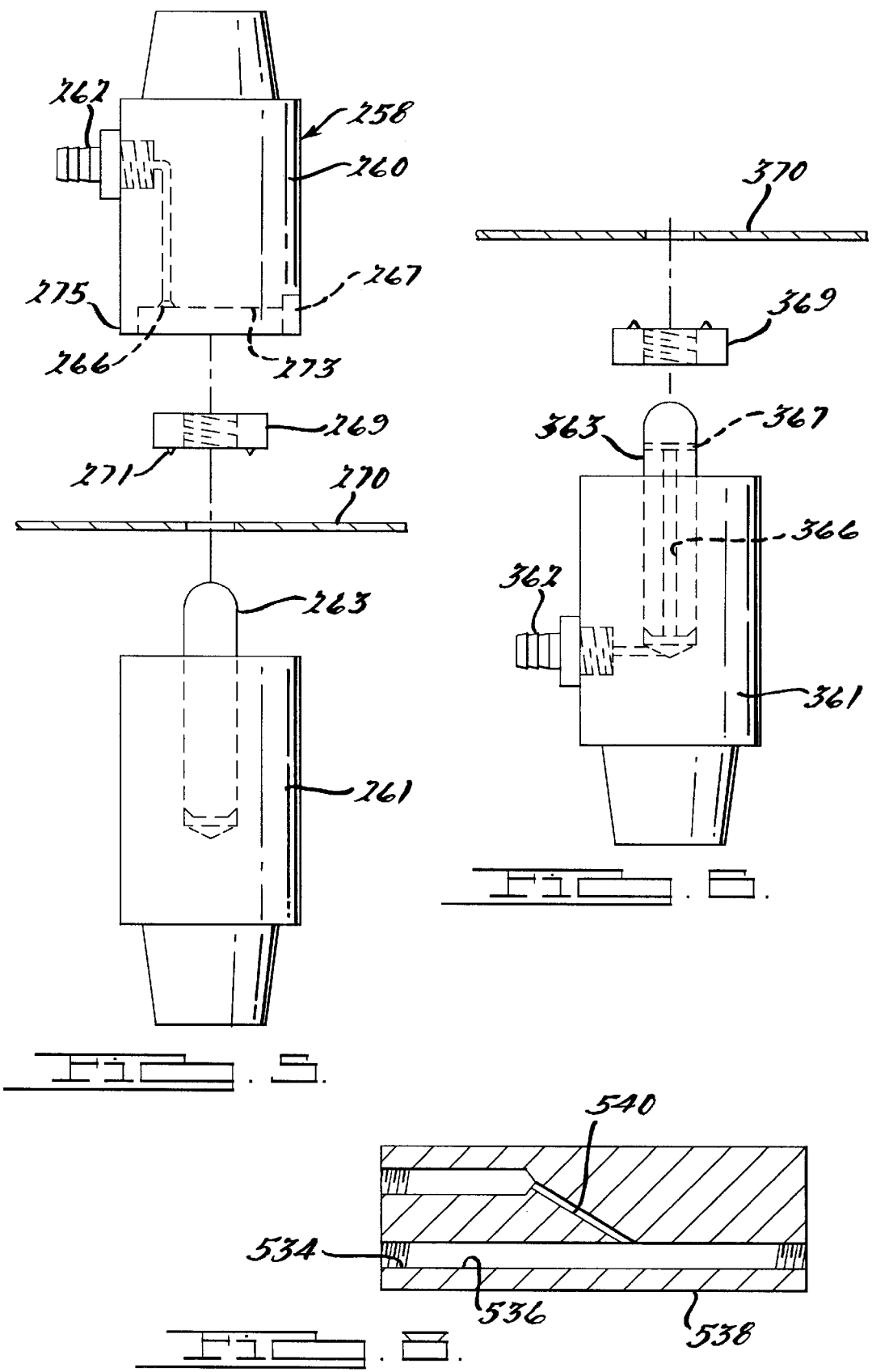

AIR PRESSURE SENSOR CONTROL SYSTEM

BRIEF SUMMARY OF THE INVENTION

This invention relates to control systems and, more particularly, to an improved air pressure sensor control system operable to sense the presence or absence of workpieces and other articles, verify the position and orientation of such articles, sense the size of such articles with respect to predetermined parameters, sense multiple criteria in multiple applications, and operate under adverse environmental conditions.

Heretofore, air pressure operated sensors have been utilized to sense the presence or absence of articles and to operate counting devices. For example, U.S. Pat. No. 4,458,519, issued Jul. 10, 1984, for an air pressure operated proximity sensor, discloses an air pressure operated proximity sensor for use in apparatus for counting articles in a shingled stream of articles. The sensor includes a first air passage leading to a probe having an orifice which is opened or restricted by the absence or presence of a surface adjacent to the probe so as to detect when the probe passes over one article to the next. Such proximity sensor also includes a branch passage having an opening into the first air passage, and an air pressure variation detecting means is provided in the branch passage, the air pressure variation detecting means being responsive to variations in air pressure caused by the opening or restriction of the orifice in the probe. The arrangement is particularly suitable for counting a "shingled" stream of printed sheets, such as signatures, the stream passing the orifice in the probe so that the orifice is opened and closed as successive printed sheets pass the probe, and the resulting signal in the air pressure sensor is then utilized to operate a counting device. While such proximity sensors are operable to sense the presence or absence of articles and can be used to operate a counting device, such prior proximity sensors cannot be used to verify the position and orientation of workpieces and other articles, cannot sense the size of workpieces with respect to predetermined parameters, cannot sense multiple criteria in multiple applications, and often cannot operate under adverse environmental conditions, such as adjacent to welding electrodes.

An object of the present invention is to overcome the aforementioned as well as other disadvantages in prior sensor control systems of the indicated character and to provide an improved air pressure sensor control system incorporating improved means for sensing the presence or absence of workpieces and other articles, for verifying the position and orientation of such articles, for sensing the size of articles with respect to predetermined parameters, for sensing multiple criteria in multiple applications, and for operating under adverse environmental conditions.

Another object of the present invention is to provide an improved air pressure sensor control system which utilizes low pressure air as an operating medium and which is operable to verify the presence, location, orientation and size of articles, such as workpieces, during manufacturing and/or inspection operations.

Another object of the present invention is to provide an improved air pressure sensor control system that is economical to manufacture and assemble, durable, efficient, and reliable in operation.

Another object of the present invention is to provide an improved air pressure sensor control system that can be utilized for workpiece positioning purposes as well as for verification purposes.

Still another object of the present invention is to provide an improved sensor control system incorporating multiple low air pressure sensing means applicable for use in multiple locations and operable under adverse environmental conditions not suited for other types of sensor devices.

The above as well as other objects and advantages of the present invention will become apparent from the following description, the appended claims and the accompanying drawings.

BRIEF DESCRIPTION OF THE DRAWINGS

FIG. 2 is an enlarged cross-sectional view of an electro-pneumatic interface module embodying the present invention, which module may be incorporated in the system illustrated in FIG. 1;

FIG. 3 is an enlarged cross-sectional view of another electro-pneumatic interface module which embodies the present invention and which may be incorporated in the system illustrated in FIG. 1 in place of the electro-pneumatic interface module illustrated in FIG. 2;

FIG. 4 is an enlarged cross-sectional view of a sensor probe embodying the present invention, the sensor probe illustrated in FIG. 4 being adapted to be incorporated in the systems illustrated in FIGS. 1 and 3 whereby weld stud presence and weld stud size may be verified;

FIG. 5 is an enlarged elevational view of another sensor probe embodying the present invention, the sensor probe illustrated in FIG. 5 being adapted to be incorporated in the systems illustrated in FIGS. 1 and 3 whereby weld nut presence, weld nut position and weld nut orientation may be verified;

FIG. 6 is an enlarged elevational view of another sensor probe embodying the present invention, the sensor probe illustrated in FIG. 6 being adapted to be incorporated in the system illustrated in FIGS. 1 and 3 whereby weld nut presence and weld nut size may be verified;

FIG. 8 is an enlarged cross-sectional view of a remote electro-pneumatic interface module which may be utilized when the associated sensor probe is located more than a predetermined distance from the control box incorporated in the system illustrated in FIG. 1.

DETAILED DESCRIPTION

In general, air pressure sensor control systems embodying the present invention include an electro-pneumatic interface module defining a main air passageway and a secondary air passageway communicating with the main air passageway intermediate the ends thereof. One end portion of the main air passageway is connected to a source of low pressure air while the other end portion of the main air passageway is connected to a sensor probe. The end portion of the secondary air passageway, remote from the end portion thereof communicating with the main air passageway, is connected to an electro-pneumatic switch which is adapted to open and close as a function of variations in the air pressure in the secondary air passageway.

The sensor probes which are connected to the main air passageway have suitable configurations which are determined by the particular application, each probe having one or more orifices to be opened, closed or restricted by the presence or absence of a workpiece surface in close proximity or in contact with the probe whereby the electro-pneumatic switch responds to variations in the pressure in the secondary passageway caused by variations in the pressure in the main air passageway effected by the opening, closing or restriction of an orifice in the probe to indicate whether or not the probe is in contact or in close proximity with a workpiece or other article. Probes embodying the present invention may be of various designs or configurations and have orifices from which low pressure air can flow freely to atmosphere and, if blocked or restricted, will cause an increase in air pressure in both the main air passageway and the associated secondary air passageway and thereby cause the electro-pneumatic switch to be actuated. With such a construction, systems embodying the present invention are effective not only to sense the presence or absence of workpieces or other articles, but are also effective to verify the position of such articles, the size and relationship of such articles with reference to predetermined parameters, and systems embodying the present invention are capable of operating under adverse environmental conditions, such as adjacent to welding electrodes. The probe design parameters and the orifices defined thereby permit the orifices to be opened, closed and/or restricted by a workpiece or other article, and the resulting signal to the electro-pneumatic switch can be utilized to signal any suitable control device, such as a programmable logic controller, incorporated in the system.

In the embodiments of the invention illustrated, the electro-pneumatic interface module defines multiple main air passageways and multiple secondary air passageways communicating with the associated main air passageways whereby multiple probes of various configurations may be utilized to sense various aspects of a workpiece or other article, or the multiple probes may be utilized to simultaneously sense multiple workpieces.

Figure 1:
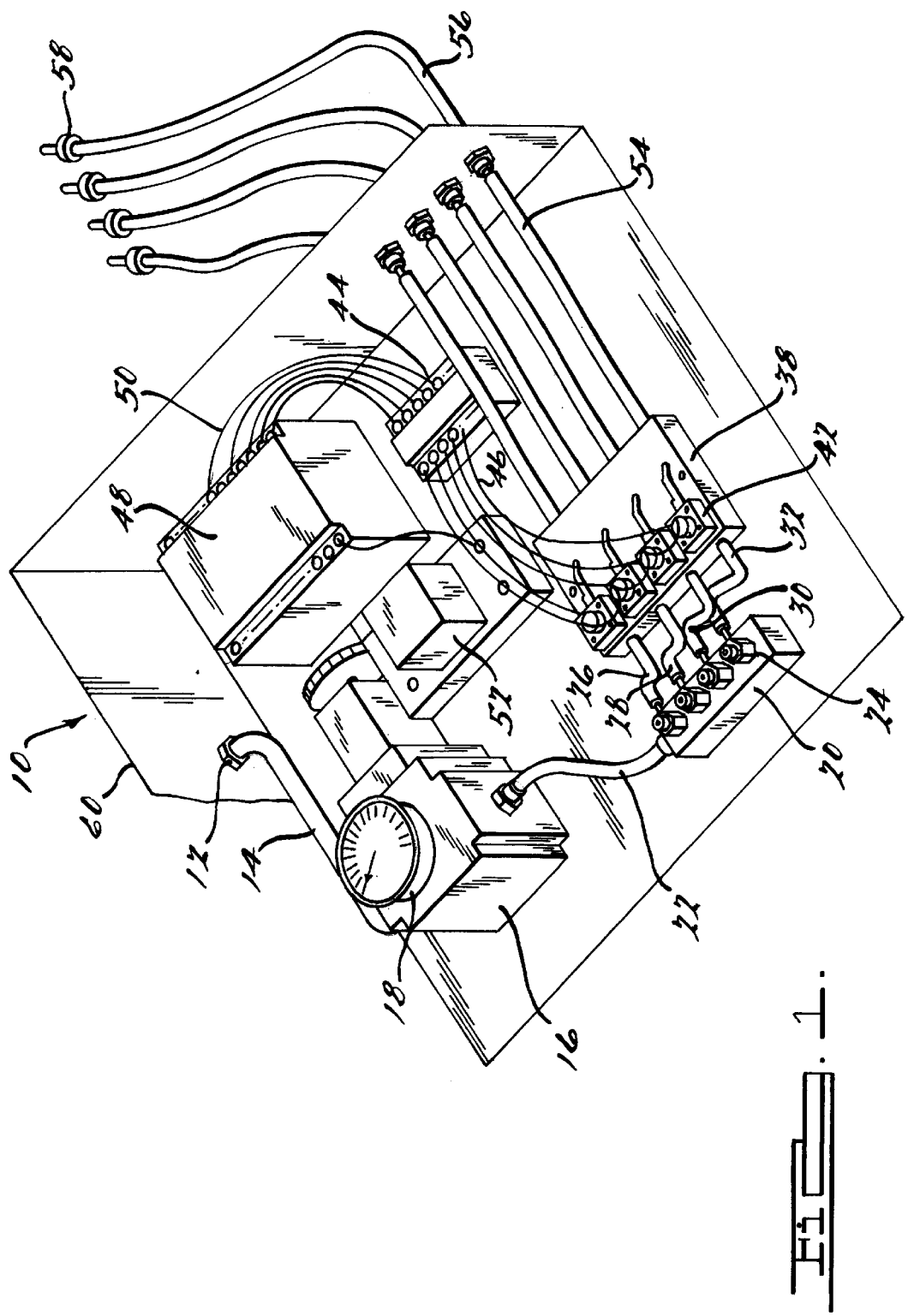
FIG. 1 is a schematic diagram of an air pressure sensor control system embodying the present invention.

Referring to the drawings, and more particularly to FIG. 1 thereof, an air pressure sensor control system, generally designated 10, is illustrated therein. The system 10 includes a bulkhead fitting 12 which is adapted to be connected to a suitable source of air pressure (not shown), the air pressure preferably being supplied at 60–120 PSIG with suitable air filtering whereby dirt particles and other foreign matter are removed from the incoming air. The air flows from the bulkhead fitting 12 through a hose 14 to a conventional air pressure regulator 16 incorporating a conventional air pressure gauge 18. The air pressure regulator functions to reduce the operating pressure required to operate the system to approximately 0.5 to 8.0 PSIG depending upon the particular application. The low pressure air is then delivered to a common port manifold 20 through the agency of a hose 22, the common port manifold being equipped with suitable needle valves, such as 24, from which the volume of air is then delivered via hoses, such as 26, 28, 30 and 32 to the inlet end portion 34 of the associated main air passageway 36 defined by the electro-pneumatic interface module 38, four such main air passageways being defined by the electro-pneumatic interface module illustrated in FIG. 1 of the drawings.

As illustrated in FIG. 2 of the drawings, the electro-pneumatic interface module 38 defines secondary air passageways, such as 40, one end portion of which communicates with the associated main air passageway 36 intermediate the ends thereof while the other end portion of each secondary passageway 40 communicates with a conventional pneumatic/electric switch 42 which is adapted to open and close as a function of variations in the air pressure in the secondary air passageway 40. Each pneumatic/electric switch 42 (four such switches being illustrated in FIG. 1 of the drawings) is electrically connected to a terminal block 44 through the agency of wires, such as 46, the terminal block 44, in turn, being connected to a conventional programmable logic controller 48 by wires such as 50, a relay 52 being provided to relay appropriate signals to a welding machine or other equipment being controlled by the air pressure sensor control system 10 embodying the present invention.

The air entering the inlet of each main air passageway 36 flows through such passageway and beyond the associated secondary passageway 40, and exits the main air passageway 36 through hoses such as 54 and 56 and flows through an associated sensor probe 58 from which the air exits to atmosphere if there is no obstruction of an orifice defined by the associated sensor probe, as will be described hereinafter in greater detail.

If there is an obstruction of the orifice, the air will be blocked from exiting the probe, and air pressure will build in the main air passageway 36 and the associated secondary air passageway 40 whereupon the pneumatic/electric switch 42, which is normally open, will close thereby providing a circuit to the programmable logic controller 48, the programmable logic controller in turn controlling a welding machine or other equipment through the agency of the relay 52 as previously described. For optimum performance, it is preferred that the cross-sectional area of the secondary air passageway 40 be approximately 10% of the cross-sectional area of the associated main air passageway 36. It should also be understood that the air volume for each sensor probe may be adjusted through the agency of the needle valves 24 which control the flow of air through the common port manifold 20. It should also be pointed out that, if desired, the main components of the air pressure sensor control system may be housed in a conventional NEMA enclosure 60, with the hoses 56 and the associated sensor probes 58 projecting from the enclosure 60.

Referring to FIG. 3, if desired, an electro-pneumatic interface module 138 embodying the present invention may be substituted in the system 10 for the electro-pneumatic interface module 38 previously described. The module 138 is provided with a main air passageway 136 which defines a venturi 137, the throat 139 of which terminates adjacent the inner end of a secondary passageway 140 which communicates with the main air passageway 136. With such a construction, the air pressure in the throat portion of the venturi decreases as the velocity of the air flowing therethrough increases, and such decrease in air pressure also tends to decrease the pressure in the secondary passageway 140 thereby increasing the range of the variations in the air pressure in the secondary passageway 140, it being understood that if an orifice in a probe is blocked, the flow of air through the main air passageway will cease and the resulting back pressure in the main air passageway 136 will be applied to the secondary air passageway 140. The remaining portions of the electro-pneumatic interface module 138 are constructed in the same manner as the module 38 previously described, and the module 138 functions in the same manner as the module 38.

Referring to FIG. 4, a probe, generally designated 158, is shown embodied in a welding electrode 160. Low pressure air is delivered from the hose 56 to the hose barb 162 located on the side of the weld stud electrode 160. The weld stud electrode 160 defines an electrode throat 164 which is open at the top of the electrode, the throat 164 communicating with the hose 56 through an orifice 166 defined by the electrode, the orifice 166 communicating with the hose 56 through the hose barb 162. The electrode 160 is intended to cooperate with an upper electrode (not shown) to weld the stud 168 to a sheet metal workpiece 170 in a conventional manner. In the operation of this embodiment of the invention, low pressure air is delivered from the hose 56 to the hose barb 162 and through the orifice 166 to the electrode throat 164. The air exits from the electrode throat through the upper face of the electrode to atmosphere. A weld stud 168 of proper size and inserted into the electrode throat 164 will disturb the outlet flow of air from the orifice 166, and a back pressure sufficient to actuate the pneumatic/electric switch in the sensor control box will be developed. Absence of a stud or a stud of smaller diameter than that for which the electrode was designed to accept will not create a restriction sufficient to create a back pressure to actuate the pneumatic/electric switch 42 in the manner previously described.

Another embodiment of the invention is illustrated in FIG. 5, this embodiment of the invention being capable of verifying weld nut presence, weld nut position and weld nut orientation. In FIG. 5, a probe, generally designated 258, is shown embodied in an upper welding electrode 260 which cooperates with a lower electrode 261 (having a pilot pin 263) to weld a nut 269 to a workpiece 270 in a conventional manner. Low pressure air is delivered from the hose 56 to the hose barb 262 located on the side of the upper electrode 260. Air exits to the atmosphere through an orifice 266 and a vent 267 defined by the upper electrode 260 in the absence of a weld nut. If a weld nut 269 is present, the crown or top of the weld nut 269 will block the outlet flow of air from the orifice 266 thereby developing a back pressure in the associated secondary passageway 40 defined by the electro-pneumatic interface module 38 so as to actuate the pneumatic/electric switch 42. If a weld nut is presented to the electrode face 273 upside down, the conventional weld nut prongs 271 will contact the electrode face 273 thereby maintaining a gap between the nut and the electrode face. Air will continue to escape to the atmosphere through such gap, and pressure will not be developed at the pneumatic/electric switch sufficient to actuate the switch. If a weld nut is not present, the standoff ring 275, not the electrode face 273, will contact the workpiece. Air will continue to flow from the orifice 266 to the atmosphere through the vent 267 in the standoff ring 275, and pressure will not be developed at the pneumatic/electric switch sufficient to actuate the switch. The inside diameter of the standoff ring 275 and the outside diameter of the weld nut 269 have a variance to allow a specified tolerance or variation from true position. If the weld nut 269 is positioned outside such allowable tolerance, the standoff ring 275 will contact the crown of the weld nut, not the electrode face 273. As a result, air flow from the orifice 266 will not be disturbed and therefore no back pressure will be developed at the pneumatic/electric switch sufficient to actuate the switch.

Another embodiment of the present invention is illustrated in FIG. 6. In this embodiment of the invention low pressure air is delivered from the hose 56 to the hose barb 362 on the side of the lower weld nut electrode 361. In the absence of a weld nut 369 the air exits the electrode 361 to the atmosphere through orifices 366 and 367 located in a pilot pin 363. The inside diameter of a weld nut of proper size located around the pilot pin 363 will disturb the outlet flow of air. This will develop a back pressure sufficient to actuate the pneumatic/electric switch. A weld nut of a smaller inside diameter than that which the pilot pin was designed to accept will not slide over the outside diameter of the pilot pin and therefore will not restrict the air flow from the orifices 366 and 367. A weld nut of a larger size than the pilot pin was designed to accept would have a large clearance between the outside diameter of the pin and the inside diameter of the nut. The air flow from both orifices in the pilot pin would not be restricted due to this clearance. Therefore air would continue to flow to the atmosphere and would not develop sufficient pressure to actuate the pneumatic/electric switch, and welding of the nut 369 to the workpiece 370 will not occur.

Figure 7:
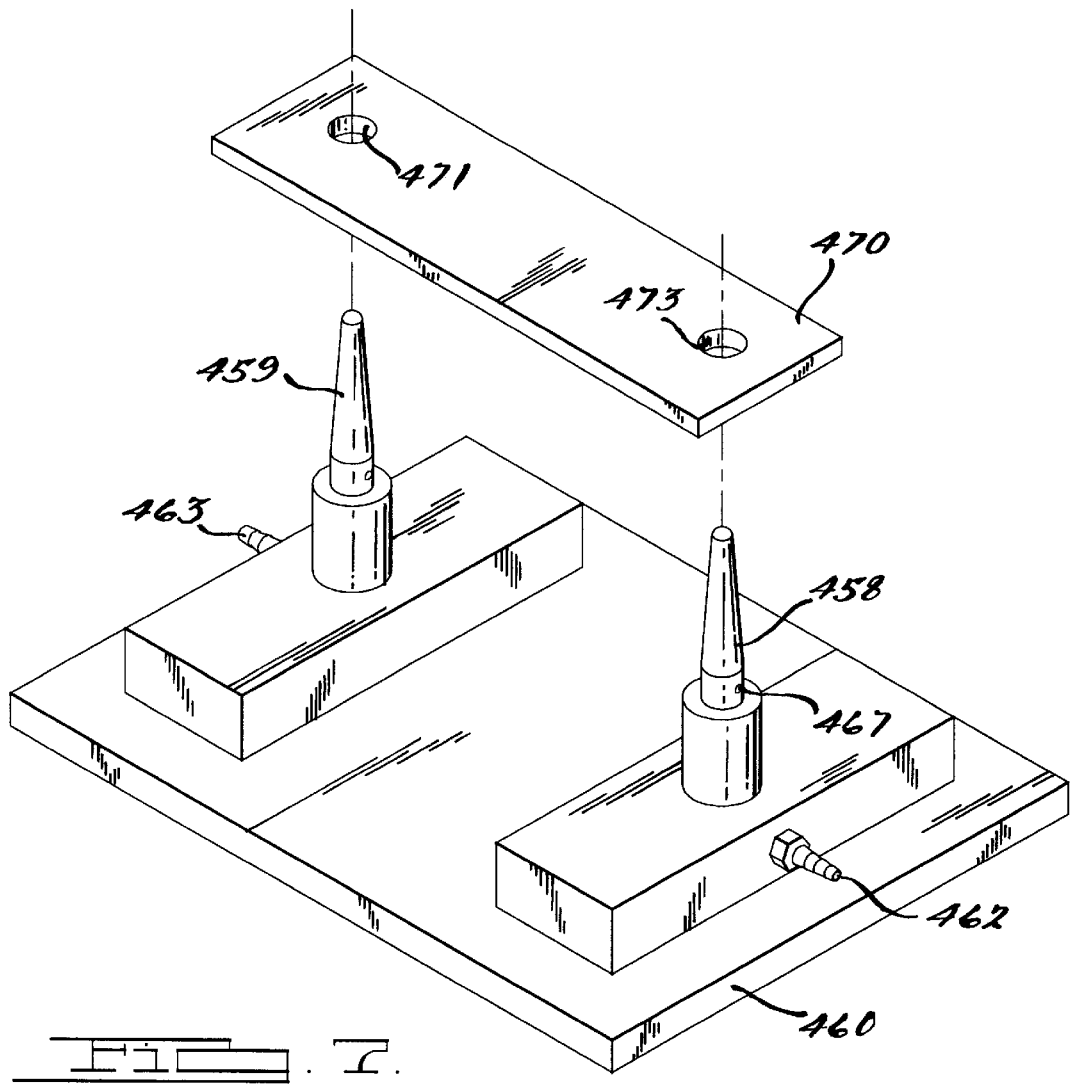
FIG. 7 is an enlarged perspective view of a pair of sensor probes embodying the present invention, the sensor probes illustrated in FIG. 7 being adapted to be incorporated in the system illustrated in FIGS. 1 and 3 in the form of an assembly fixture whereby the sensor probes function to locate the workpiece and also function to sense the presence of the workpiece.
Figure 7A:
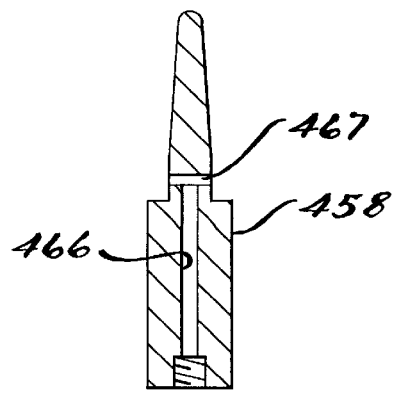
FIG. 7A is a cross-sectional view of the sensor probes illustrated in FIG. 7.

Another embodiment of the invention is illustrated in FIG. 7. In this embodiment of the invention, the sensor probes 458 and 459 are adapted to be mounted on a fixture base 460 whereby the sensor probes 458 and 459 function to locate a workpiece and at the same time function to sense the presence of a workpiece. In this embodiment of the invention, low pressure air is delivered from a pair of hoses, such as 56, to the hose barbs 462 and 463 located on the fixture base 460. In this embodiment of the invention, the probes 458 and 459 function as locating pins mounted on the fixture base 460, the locating pins defining an internal longitudinally extending orifice 466 which communicates with a transversely extending orifice 467 as shown in FIG. 7A whereby the low pressure air flows to atmosphere through such orifices if the orifices are not blocked by a workpiece such as 470. The locating pins thus perform the double function of mechanically locating the workpiece which defines holes 471 and 473 adapted to receive the locating pins, and at the same time if the workpiece is properly positioned on the locating pins, the workpiece blocks the transversely extending orifice 467 so that the flow of air through the orifices 466 and 467 is blocked thereby developing a back pressure in the secondary air passageways 40 sufficient to actuate the associated pneumatic/electric switches 42. On the other hand, if a workpiece is not present, air will continue to flow from the orifices 466 and 467 to the atmosphere, and back pressure will not be developed at the pneumatic/electric switches 42 sufficient to actuate the switches.

In installations in which the various sensor probes are located more than approximately five feet away from the electro-pneumatic interface module, a back pressure may be created in the air passageways and hoses 56 sufficient to activate the pneumatic/electric switch. Such back pressure may be caused by friction or resistance of air to flow through the hoses 56. In FIG. 8, a remote electro-pneumatic interface 538 is illustrated which functions to overcome the problem of excessive back pressure in unduly long hoses. In accordance with the present invention, the remote electro-pneumatic interface module 538 overcomes the excessive back pressure problem by being located relatively close to the sensor probes 58. In this embodiment of the invention, a dual air line (not shown) is installed between the common port manifold 20 and the remote electro-pneumatic interface module 538. One air line directs the air from a needle valve on the distribution manifold 20 to the inlet 534 of the associated main air passageway 536 defined by the remote interface module while the second air line directs the air back pressure from the secondary air passageway 540 defined by the remote module to the pneumatic/electric switch 42. The other components of the control system remain the same as shown in FIG. 1 of the drawings. It has been found that the distance from the manifold 20 to the sensor probes can be increased to at least 18 feet without any appreciable variation in the response time of the system. As an alternative to the back pressure problem alleviated by the remote module concept previously described, it is possible to use a pneumatic/electric switch in which the sensitivity may be adjusted to meet the requirements of the application. The interface module would then be of the design illustrated in FIGS. 1, 2 or 3.

From the foregoing, it will be appreciated that air pressure sensor control systems embodying the present invention are capable of detecting the presence or absence of workpieces and other articles, of verifying the position and orientation of such articles, of sensing the size of articles with respect to predetermined parameters, and of sensing multiple criteria in multiple applications, all through the use of low pressure, low volume air flow. Using sensor probes designed for specific applications, air flows freely from the probes into the atmosphere in the absence of a workpiece or other article. When an article obstructs or disturbs the flow of air, a positive signal if received at a pneumatic/electronic switch whereupon the signal is converted into an electrical signal for interfacing with a programmable logic controller or other control device. Probe systems embodying the present invention can be used under adverse environmental conditions, for example, directly in the weld zones for metal inert gas, tungsten inert gas and resistance welding applications. Sensors embodying the present invention can be also used in locations where it is practically impossible to place a mechanically activated device or where electronic sensors would fail due to heat or other adverse conditions. Sensing probes embodying the present invention may be incorporated into the design of a machine, fixture or tooling, for example as pilot or locating pins or as non-contact sensors where physical contact with the objects to be sensed is undesirable. Moreover, probes embodying the present invention can perform multi-purpose functions, checking such factors as part presence, part location, orientation, counting and other verification requirements. Also, sensors embodying the present invention are inherently explosion proof and self purging, and each individual sensor is field adjustable for a wide range of applications and adaptations. Systems embodying the present invention are capable of multiple point sensing as well as remote point sensing. In addition, systems embodying the present invention have the ability to operate on air pressure as low as 0.5–2.0 lbs. per square inch gauge without the use of air boosters, and the use of low pressure air will not cause workpieces to be blown from fixtures or other tooling, as may be the case if high pressure air is utilized.

From the foregoing, it will also be appreciated that air pressure sensor control systems embodying the present invention can be used in the fields of inspection and verification of workpieces. For example, a workpiece with numerous holes or variations in form or contour can be inspected with systems embodying the present invention. The workpieces can be inspected during the manufacturing process or when such article is a complete part or component. Inspection can be accomplished by positioning orifices in the tooling or in an inspection fixture at strategic points to sense back pressure or lack of back pressure. The absence or presence of a hole, the size and position of holes and gap tolerances between the fixture form and the shape or contour of the workpiece are all able to be detected. The means of delivering air to an electrode face are numerous in design and are not limited to the particular structure shown in the drawings. For example, a standoff may be machined into the face of an electrode or a sleeve can be pressed onto the electrode to create the same effect. Orifice size, shape and position may vary with applications and are dependent upon the article being sensed. For example, there are numerous styles and designs of electrodes and weld nuts on the market, and each may require its own unique adaptation to accomplish the same results. Some weld nut electrodes may have a floating pilot pin positioned by air or spring pressure. These could be addressed in a different manner but the same results would be obtained, i.e. workpiece presence, workpiece positions and/or workpiece orientation.

While preferred embodiments of the invention have been illustrated and described, it will be understood that various changes and modifications may be made without departing from the spirit of the invention.

What is claimed is:

1. An air pressure sensor control system comprising, in combination, an electro-pneumatic interface module defining a main air passageway and a secondary air passageway communicating with said main air passageway intermediate the ends thereof, means connecting one end portion of said main air passageway to a source of low pressure air, means connecting the other end portion of said main air passageway to sensor probe means defining a first orifice, said sensor probe means being effective to perform a double function of sensing predetermined criteria respecting a workpiece and also perform a manufacturing operation on a workpiece, electro-pneumatic switch means communicating with the end portion of said secondary air passageway remote from said main air passageway and operable to open and close an electrical circuit as a function of variations in the air pressure in said secondary air passageway, variations in the pressure in said secondary air passageway being effected by the opening, closing or restriction of the passage of air through said first orifice defined by said probe means.

2. The combination as set forth in claim 1, said probe means being effective to sense the position of a workpiece.

3. The combination as set forth in claim 1, said probe means being effective to sense the size of a workpiece.

4. The combination as set forth in claim 1 including adjustable means effective to vary the pressure and control the volume of air delivered to said main air passageway.

5. The combination as set forth in claim 1, said interface module defining multiple main air passageways and multiple secondary air passageways communicating with the associated main air passageways, and a plurality of probes connected to said multiple main air passageways.

6. The combination as set forth in claim 1, the cross-sectional area of said secondary air passageway being approximately 10% of the cross-sectional area of the associated main air passageway.

7. The combination as set forth in claim 1, said electro-pneumatic interface module defining venturi means disposed in said main air passageway upstream and adjacent to said secondary air passageway.

8. The combination as set forth in claim 1 including programmable logic controller means controlled by said electro-pneumatic switch means.

9. The combination as set forth in claim 1, said sensor probe means being in the form of a resistance welding electrode effective to perform a welding operation and also effective to detect the presence, size, position and orientation of a weld nut workpiece, said sensor probe means including a body portion having a recessed face at one end thereof communicating with said first orifice, said body defining a slot communicating with said recessed face and extending to the outer perimeter of said body, said electro-pneumatic switch means being effective to sense variations in pressure levels of air supplied through said first orifice defined by said body to said recessed face and indicating variations from a predetermined position, orientation and size of a weld nut.

10. The combination as set forth in claim 1, said sensor probe means being in the form of a welding electrode effective to perform a welding operation and also effective to detect the orientation and size of a weld nut workpiece, said sensor probe means including a body portion defining said first orifice, a pilot pin carried by said body portion, said pilot pin defining a second orifice extending longitudinally of said pilot pin and communicating with said first orifice, said electro-pneumatic switch means being effective to sense variations in pressure levels of air supplied through said first and second orifices and indicating variations from predetermined orientation and size criteria of a weld nut.

11. The combination as set forth in claim 1, said sensor probe means being in the form of a welding electrode effective to perform a welding operation and also effective to detect the presence and the size of a weld stud, said welding electrode including a body defining a throat open at one end of said body and communicating with said first orifice, said electro-pneumatic switch being effective to sense variations in pressure levels of air supplied through said first orifice into said electrode throat to indicate the presence and variations in predetermined size criteria of a weld stud.

12. An air pressure sensor control system for use in apparatus for performing manufacturing operations on workpieces, said system including, in combination, an electro-pneumatic interface module defining a main air passageway and a secondary air passageway communicating with said main air passageway intermediate the ends thereof, means for connecting one end portion of said main air passageway to a source of low pressure air, a sensor probe defining an orifice, means connecting the other end portion of said main air passageway to said sensor probe, said sensor probe being effective to perform a double function of sensing predetermined criteria respecting a workpiece and also to perform a manufacturing operation on a workpiece, an electro-pneumatic switch means adapted to open and close an electrical circuit as a function of variations in the air pressure in said secondary air passageway, said electro-pneumatic switch means communicating with the end portion of said secondary air passageway remote from said main air passageway, the orifice defined by said sensor probe being adapted to be opened, closed or restricted by the absence or presence of a workpiece surface in proximity with said probe whereby said electro-pneumatic switch means responds to variations in the pressure in said secondary air passageway caused by variations in the pressure in the main air passageway effected by the opening, closing or restriction of said orifice in said probe.

13. The combination as set forth in claim 11, said electro-pneumatic interface module defining a plurality of main air passageways and a plurality of secondary air passageways communicating with an associated main air passageway intermediate the ends thereof.

14. The combination as set forth in claim 11, said probe being effective to sense the position of a workpiece.

15. The combination as set forth in claim 13, said probe also being effective to sense the size of a workpiece.

16. The combination as set forth in claim 12 including adjustable means effective to vary the pressure and control the volume of air delivered to said main air passageway.

17. The combination as set forth in claim 16, said interface module defining multiple main air passageways and multiple secondary air passageways communicating with associated main air passageways, and a plurality of probes connected to said multiple main air passageways.

18. The combination as set forth in claim 17, the cross-sectional area of said secondary air passageway being approximately 10% of the cross-sectional area of the associated main air passageway.

19. The combination as set forth in claim 18, said electro-pneumatic interface module defining venturi means disposed in said main air passageway upstream and adjacent to said secondary air passageway.

20. The combination as set forth in claim 19 including programmable logic controller means controlled by said electro-pneumatic switch means.

\* \* \* \* \*